United States Patent [19]

Schukei et al.

[11] Patent Number: 4,480,841
[45] Date of Patent: Nov. 6, 1984

[54] APPARATUS AND METHOD FOR SEALING A TUBE JOINT

[75] Inventors: Glen E. Schukei, South Windsor; Frank J. Formanek, West Suffield; Donald V. Graf, Simsbury, all of Conn.

[73] Assignee: Combustion Engineering, Inc., Windsor, Conn.

[21] Appl. No.: 434,092

[22] Filed: Oct. 13, 1982

[51] Int. Cl.³ .................... F16J 15/08; F16L 33/11
[52] U.S. Cl. .................................... 277/1; 277/190
[58] Field of Search ............... 211/1, 190, 191, 237 R

[56] References Cited

U.S. PATENT DOCUMENTS

| | | | |
|---|---|---|---|
| 3,207,523 | 9/1965 | Johnson | 277/190 |
| 3,479,063 | 11/1969 | Rauer | 277/190 |
| 3,971,566 | 7/1976 | Levinsohn | 277/1 |
| 4,193,604 | 3/1980 | Saraunne | 277/190 |
| 4,281,841 | 8/1981 | Kim et al. | 277/1 |

Primary Examiner—Robert I. Smith
Attorney, Agent, or Firm—Troxell K. Snyder

[57] ABSTRACT

An apparatus for sealing a joint between two substantially collinear tubes (12,14) is provided. Particularly useful for repairing a welded joint which has developed a crack (20) in the area of the weld (18), the apparatus provides a sleeve (26) which fits closely over the cracked joint. A housing (32), surrounding the sleeve (26), and a thrust ring (38) act to compress packing rings (28,30) against the sleeve to form a fluid-tight seal over the leaking joint. The sealing nut (40) maintains compression on the packing rings (28,30) when the installation apparatus (50,60,70) is removed. A method for installing the sealing apparatus is also disclosed herein.

10 Claims, 5 Drawing Figures

APPARATUS AND METHOD FOR SEALING A TUBE JOINT

FIELD OF THE INVENTION

This invention relates to an apparatus for sealing a joint between two tubes and, more particularly, to an apparatus for sealing a linear joint between two tubes.

BACKGROUND OF THE INVENTION

One current problem in the field of boiling water nuclear reactors is the leakage which occurs around the control rod nozzles in the reactor vessel. In a boiling water reactor the control rods are driven upwardly through nozzles in the lower portion of the reactor vessel. These nozzles are supported by stub tubes on the interior of the reactor vessel and the entire nozzle assembly is sealed by means of an annular weld between the nozzle tube and the stub tube end.

During the operation of boiling water reactors with the above described nozzle and stub tube arrangement, cracks have been found occasionally to occur in the stub tube in the area of the sealing weld. Radioactive fluid at high pressure contained within the interior of the reactor vessel can leak through these cracks and pass to the exterior of the reactor vessel. This leakage is highly undesirable and must be corrected for continued operation of the nuclear reactor.

It is also important to note that the nozzle and stub tube joints in a reactor are frequently not symmetric, usually in the form of a centerline offset or angular misalignment between the nozzle and stub tube. This non-symmetry results from the heat treatment of the reactor vessel after the installation of the stub tubes. The positioning of the stub tubes changes during the heat treatment due to materials differences between the vessel and stub tube. The stub tube bore is then re-machined during installation of the nozzle tube to properly position the control rods in the reactor core. The result of this re-machining is a substantially linear tube joint wherein the centerline of the tube exteriors may be offset as much as 0.100 inches (0.25 cm).

The repair of this situation is complicated by the generally high radiation environment of the interior of the reactor vessel and the location of the stub tube in the bottom of the reactor vessel underneath the reactor internals. Prior art methods of replacing or rewelding the stub tube member require removal of the reactor internals and complete draining of the reactor vessel, both expensive and time consuming processes. What is needed is a technique for stopping the leakage of the internal reactor fluid through these cracks in the reactor stub tubes which may be effected remotely without extensive removal of the reactor internals or draining of the reactor vessel. Remote installation would also have the advantage of not requiring removal of all the nuclear fuel located in the reactor vessel in order to make the vessel interior safe for repair personnel.

SUMMARY OF THE INVENTION

The present invention provides a simple and effective apparatus for sealing the joint between two substantially collinear tubes. The apparatus may be placed into position and engaged remotely and is therefore particularly well suited for resolution of the stub tube crack leakage problem discussed in the above section. It may, however, be applied to other tube joints as well.

According to the present invention, a cylindrical sleeve is shown positioned over the joint to be sealed. In the stub tube crack leakage situation, the sleeve will pass over not only the original stub and nozzle tube seal weld, but also over the crack in the stub tube. The sleeve is configured to fit closely around the joined tubes, particularly at the upper and lower ends.

Surrounding the sleeve is a cylindrical housing with an inner lip for holding a package ring against the lower end of the sleeve. A second packing ring is located at the upper end of the sleeve in contact with a thrust ring fitting between the housing and the upper tube. A threaded sealing nut holds the thrust ring and the lip in compression against the packing rings and sleeve forming a fluid-tight seal between the sleeve and the tubes.

During installation, the thrust ring and housing may be compressed externally and the sealing nut then tightened into place for retaining the members in the compressed position. This method of installation has the advantage of minimizing the movement of the packing rings over the tube surfaces, thus avoiding possible damage to the packing.

DESCRIPTION OF THE PREFERRED EMBODIMENT

Figure 1:
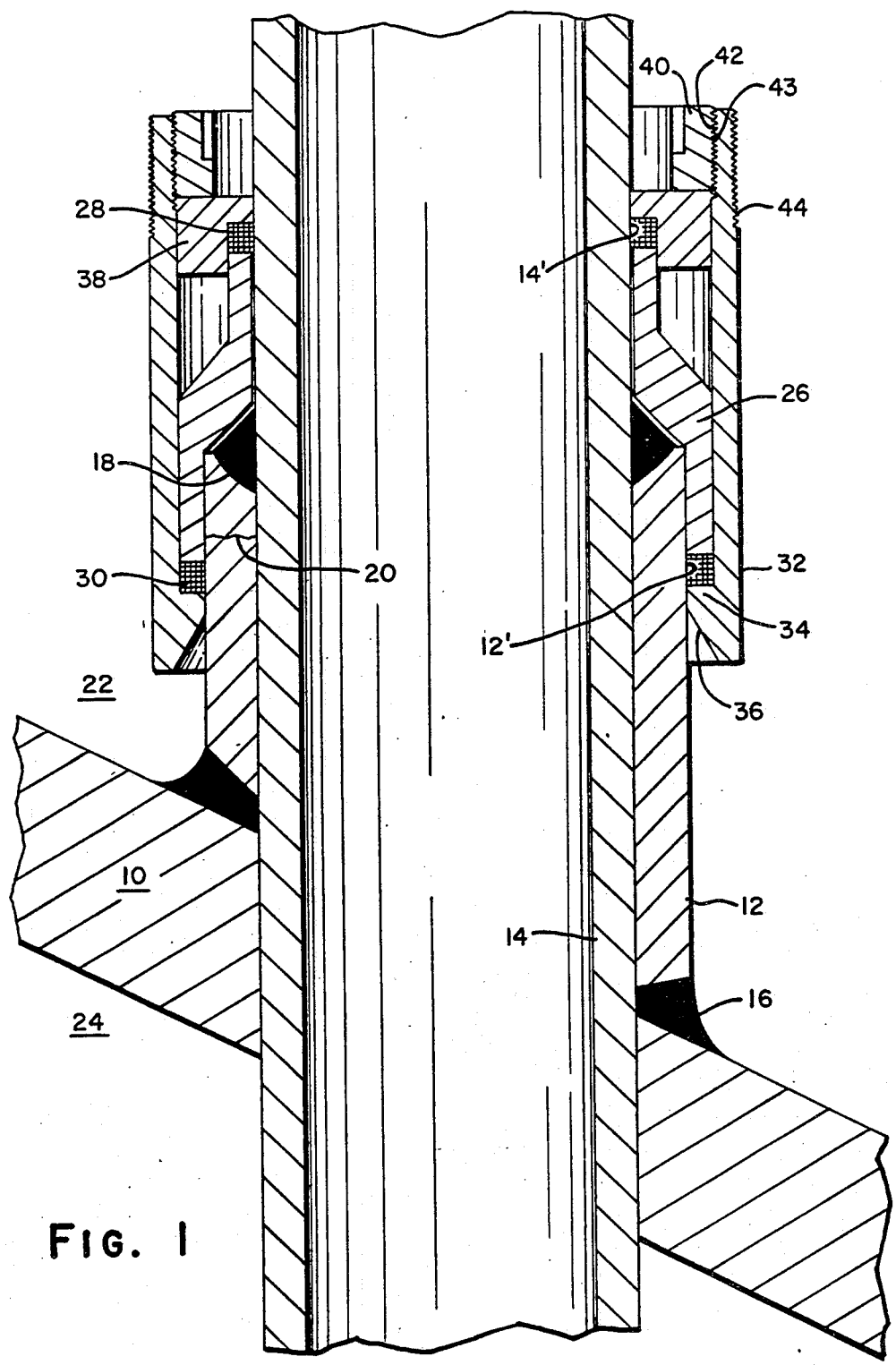
FIG. 1 is a cross-sectional view of the apparatus as installed on a leaking nozzle arrangement in a boiling water reactor.

FIG. 1 shows a simple embodiment of the apparatus according to the present invention as installed in a nuclear reactor vessel 10. A stub tube 12 is shown welded at 16 to the interior of the reactor vessel wall 10 and surrounding the nozzle tube 14 which carries control rods passing upwardly into the reactor core (not shown). The stub and nozzle tubes 12,14 are shown as joined to each other by seal weld 18.

During operation of the above described arrangement, cracks 20 have been found to occur in the stub tube 12 just below the weld 18. High pressure reactor cooling fluid on the interior 22 of the reactor vessel leaks through crack 20, flows downwardly through the annulus formed between the nozzle tube 14 and the stub tube and reactor vessel wall 12,10, and passes to the exterior 24 of the reactor vessel. This leakage flow may be radioactive and thus hazardous to personnel or equipment with which it may come in contact.

Repair of this leakage is hampered by the location of the nozzle and stub tubes in the lower portion of the reactor vessel underneath the fuel assemblies. Replacement or rewelding of the stub tube 12 requires removal of all the nuclear fuel assemblies and associated support structure from the reactor vessel and complete draining of the reactor cooling fluid to provide access to the stub tube. In nuclear reactors which have been in operation for even a short time, the interior of the reactor vessel is still radioactive, thus making the work area hazardous for repair personnel.

The present invention provides an apparatus which may be remotely installed over the leaking tube joint and nearby area without the need for extensive removal of the fuel assemblies and structures and without the need for draining the reactor vessel. According to the present invention, a sleeve 26 is shown surrounding the tube joint in a closely fitting manner. The sleeve 26 is generally cylindrical and contacts upper and lower packing rings 28,30 which are held adjacent to the tubes and the ends of the sleeve.

A housing 32 is shown surrounding the sleeve and fitting closely with the lower end thereof. An internal annular lip 34, integral with the housing, holds the packing ring 30 opposite the lower end of the sleeve in the axial direction. The lip 34 also includes an internal chamfer 36 which aids in the positioning of the apparatus over the nozzle and stub tubes during installation.

A thrust ring 38 fits between the interior of the housing 32 at the upper end and the nozzle tube 14. The thrust ring contacts the upper packing 28 opposite the upper end of the sleeve in the axial direction.

The present invention provides a means for urging or compressing the thrust ring 38 and housing 32 inwardly against the packing rings and sleeve in the form of a sealing nut 40 disposed adjacent to the upper end of the housing 32. In the preferred embodiment the sealing nut 40 is provided with external threads 42 for engaging corresponding threads 43 in the upper end of the housing 32. In this manner compressive force is maintained against the packing rings 28,30 without cooperation from any structures exterior to the apparatus.

During installation, the apparatus comprising the sleeve 26, housing 32, packing rings 28,30, thrust ring 38, and compressing means 40, is slipped over the previously determined leaking joint. The thrust ring 38 and the housing 32 are compressed axially against the respective upper and lower packing rings 28,30 which are restrained from expansion in the outward radial direction. The axial compression of the packing rings between the lip 34, sleeve 26 and thrust ring 38 causes the inward radial expansion of the packing rings 28,30 thus forming a seal with the corresponding tube exterior surface 12',14'.

The packing rings 28,30 may be any of a variety of compressive sealing structures such as resilient O-rings, shaped metal seals, deformable material, curable resin, or the like. Pure graphite has been found to be a suitable material for this application and is also resistant to the high radiation environment.

Figure 3:
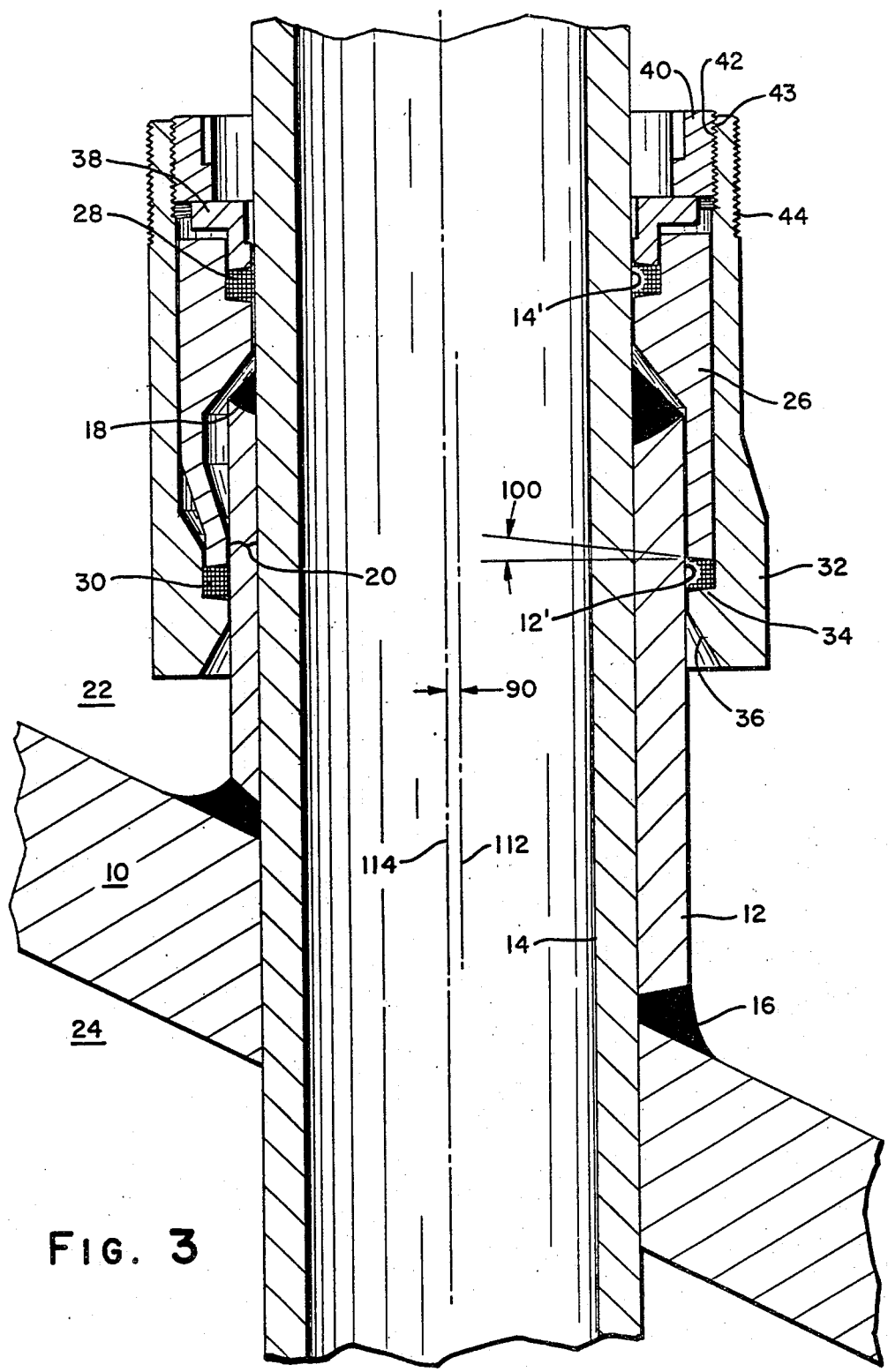
FIG. 3 shows the preferred embodiment of the present invention as installed on an offset nozzle and stub tube joint.

FIG. 3 shows the preferred embodiment of the present invention installed over a tube joint in which the nozzle tube centerline 114 and the stub tube centerline 112 are offset 90. This offset 90 is accommodated by the non-symmetric configuration of the housing 32 and sleeve 26 as shown in FIG. 3.

In actual practice, the magnitude of the offset 90 of an individual nozzle and stub tube joint will vary from joint to joint, depending on location and prior heat treatment. For a proper fit, therefore, each sealing apparatus must be fabricated specifically for each joint to be sealed. Since this magnitude of the offset 90 of a particular tube joint in a nuclear reactor is not known until measured, and since measurement requires access, at least remotely, to the interior 22 of the reactor vessel, it is advantageous to complete the measuring and sealing operations in one plant shutdown.

Figure 4A:
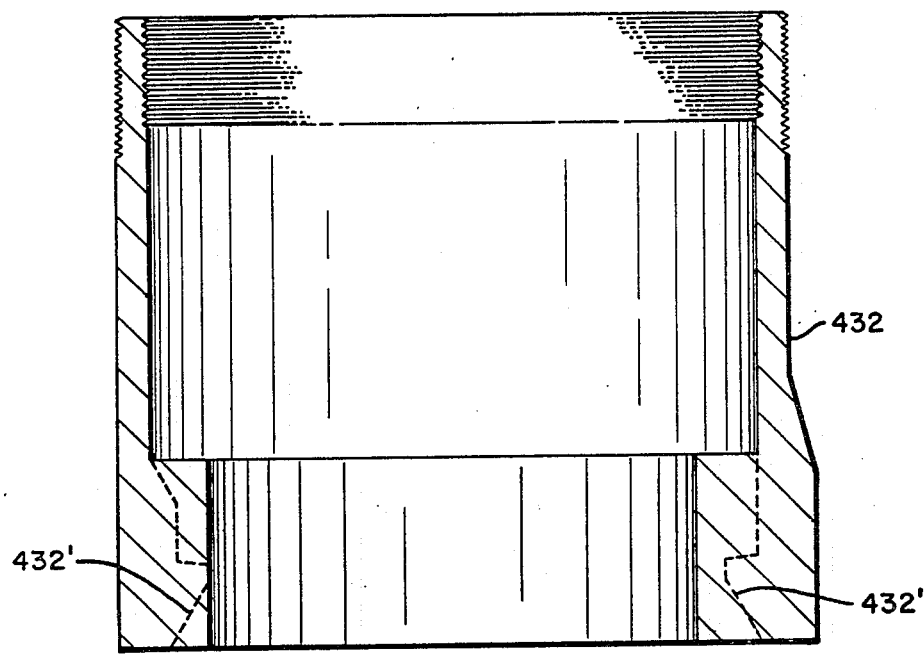
FIGS. 4(a) and 4(b) show the partially finished housing blank and sleeve blank.
Figure 4B:
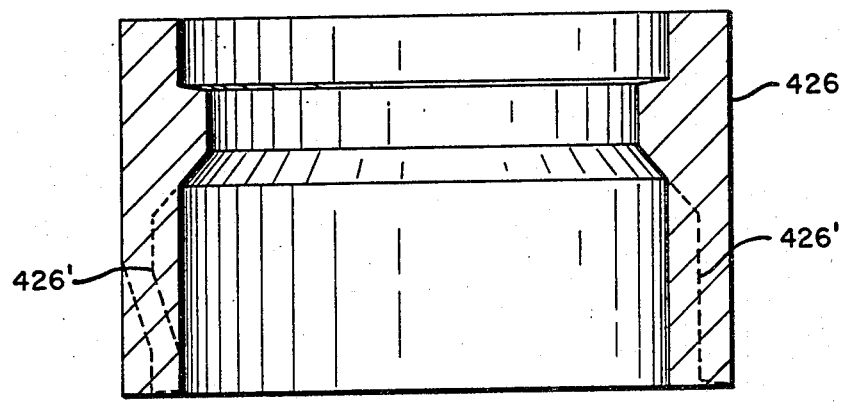

This is facilitated by supplying a housing blank 432 and a sleeve blank 426 as shown in FIGS. 4(a) and 4(b). These blanks, along with the remaining component parts, are delivered to the reactor site prior to the installation. Upon measurement of the magnitude of the offset for a particular tube joint, the housing and sleeve blanks 432,426 are machined on site to the proper configuration. The phantom lines 432',426' show the finished housing 32 and sleeve 26 for the tube joint shown in FIG. 3. The seal apparatus is then assembled and installed in the reactor during the same shutdown period.

The preferred embodiment of FIG. 3 also discloses an alternate configuration of the thrust ring 38 and upper sleeve 26. In this embodiment the sleeve 26 surrounds and restrains the packing ring 28 in the outward radial direction while the thrust ring 38 is configured to only contact the upper packing ring 28 axially. This arrangement is believed to result in a larger sealing area between the sleeve 26 and upper packing ring 28.

One final feature of the preferred embodiment is the slight inward inclination 100 of the surfaces of the sleeve 26, housing 32, and thrust ring 38 that contact the packing rings 28,30 in the axial direction. This inclination 100, approximately 5 degrees from the radial plane, is in the direction of the particular packing ring with increasing radial displacement. During compression, the outermost portions of the packing rings 28,30 are thus subjected to a higher axial force, resulting in greater inward radial expansion and a more effective seal.

As discussed above, the nozzle and stub tubes 12,14 may also be misaligned angularly as well as offset 90. This misalignment (not shown) is accommodated by the apparatus in the same manner as the offset 90, i.e. by configuring the housing 32 and sleeve 26 non-symmetrically as shown in FIG. 3. The small angular misalignment of the tube surfaces is accommodated and sealed when the packing rings 28,30 are compressed.

Figure 2:
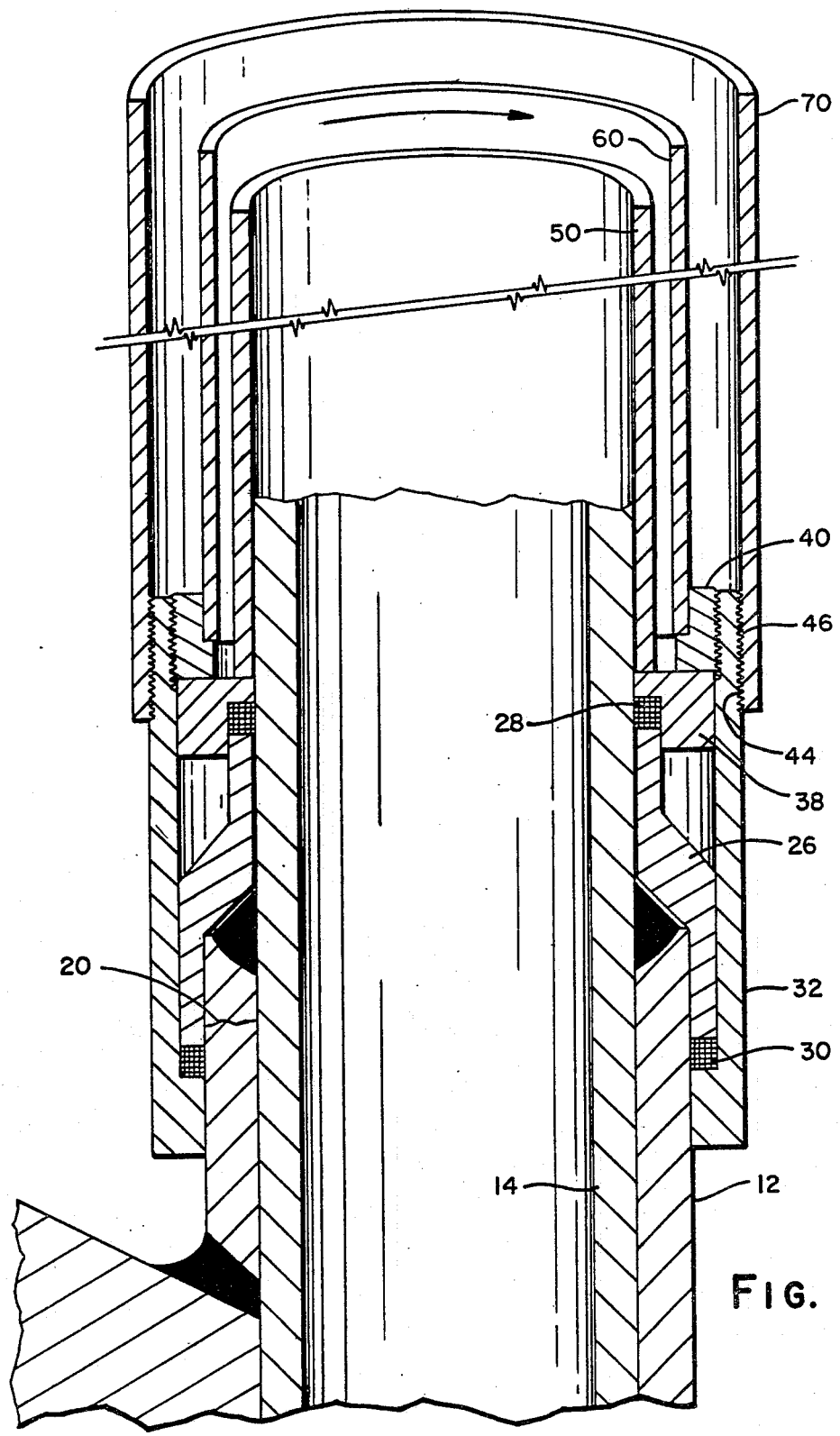
FIG. 2 shows the apparatus during installation along with a cross-sectional view of the installation apparatus.

A suitable means for installing the sealing apparatus herein disclosed comprises three concentric tubes 50,60,70 shown in FIG. 2. The outermost tube 70 has internal threads 46 for engaging the external threads 44 shown on the housing 32. The apparatus is positioned and supported by means of the outermost tube 70 during installation. The innermost tube 50 is sized to slide between the nozzle tube 14 and the sealing nut 40 for contacting the thrust ring 38.

By exerting an upward force on the outermost tube 70 and a downward force on the innermost tube 50 the packing rings 28,30 are compressed and form the desired seal.

The apparatus is then internally locked in this compressed, sealed state by engaging the sealing nut 40 with the intermediate tube 60 and rotating the engaged members. After the sealing nut 40 is in contact with the compressed thrust ring 38, the forces on the inner and outermost tubes 50,70 are released and the installation means 50,60,70 disengaged from the installed apparatus.

The installation means employed permits remote installation of the sealing apparatus through a narrow access channel (not shown) formed by removing only those nuclear fuel assemblies located immediately above the leaking stub tube in the reactor core area. The required diameter of this channel is only slightly larger than the outside diameter of the sealing apparatus assembly.

It has also been found to be advantageous to introduce an inert gas locally during installation in order to temporarily drive away the surrounding reactor cooling fluid. Nitrogen has been found to be a suitable gas for this purpose.

The present invention thus provides a simple and effective method for sealing a joint between two collinear tubes. Although the preferred embodiment shown here is directed to the nozzle and stub tube joint in a boiling water reactor, the present invention is also applicable to substantially collinear tubes of equal exterior diameters and other applications wherever a fluid-tight seal is required.

The apparatus of the present invention also has the advantages of not requiring welding during installation and the ability to be installed remotely in a nuclear reactor without extensive removal of the reactor internals.

We claim:

1. Apparatus for sealing a joint between substantially collinear first and second tubes, comprising:
   a sleeve of cylindrical shape, having a lower end fitting closely around said first tube and an upper end fitting closely around said second tube, for surrounding the portion of said joint to be sealed;
   a cylindrical housing fitting closely over the exterior of the lower end of the sleeve and extending upwardly over the upper end of the sleeve and having an inner, annular lip disposed adjacent the lower end of the housing;
   a lower packing ring, disposed between the lower end of the sleeve and the housing lip for forming a seal between the sleeve and said first tube;
   a thrust ring fitting closely between the interior of the upper end of the housing and said second tube;
   an upper packing ring disposed between the upper end of the sleeve and the thrust ring, for forming a seal between the sleeve and said second tube; and
   means, cooperating with the housing, for urging the thrust ring against the upper packing ring and the housing lip against the lower packing ring, whereby both packing rings are compressed against the sleeve and form a seal about said joint.

2. The apparatus for sealing a joint of claim 1 wherein the means for urging the thrust ring against the upper packing ring and the housing lip against the lower packing ring comprises a sealing nut having screw threads for engaging corresponding threads in the housing.

3. The apparatus for sealing a joint of claim 1, wherein the housing includes an internal chamfer around the lower end for assisting in locating the apparatus during installation.

4. The apparatus for sealing a joint of claim 2 wherein the housing includes an internal chamfer around the lower end for assisting in locating the apparatus during installation.

5. A method for remotely installing the apparatus for sealing a tube joint recited in claim 1, comprising the steps of:
   positioning said apparatus around said joint;
   externally holding said apparatus in position around said joint;
   externally compressing said apparatus axially for causing said apparatus to sealingly engage said tube joint thereby forming a seal against joint leakage; and
   locking said apparatus internally to retain said apparatus in the engaged, compressed state when the external compressing and holding forces are removed.

6. A method for remotely installing an apparatus for sealing a joint between two substantially colliner tubes, said apparatus having a sleeve, a housing, two packing rings, a thrust ring, and a sealing nut, comprising the steps of:
   engaging the housing of said apparatus with a first installation tube;
   positioning and supporting said apparatus around said tube joint by means of said first installation tube;
   contacting the thrust ring of said apparatus with a second installation tube;
   compressing said apparatus axially by simultaneously exerting an upward force on said first installation tube and a downward force on said second installation tube, whereby the packing rings are compressed against the sleeve, forming a seal around said tube joint;
   engaging the sealing nut with a third installation tube and rotating said third installation tube for causing the sealing nut to contact the thrust ring, whereby said apparatus is locked in the compressed, sealed state; and
   disengaging and removing said first, second, and third installation tubes.

7. The method of claim 5, wherein said joint is immersed in a fluid environment, further comprising the step of introducing an inert gas in the area of the tube joint during installation for displacing the surrounding fluid.

8. The method of claim 6, wherein said joint is immersed in a fluid environment, further comprising the step of introducing an inert gas in the area of the tube joint during installation for displacing the surrounding fluid.

9. An apparatus for sealing a leaking joint between a nozzle and a stub tube in a nuclear reactor, said leak resulting from a crack in said stub tube in the area of said joint; comprising:
   an upper packing ring for surrounding said nozzle tube above said crack;
   a lower packing ring for surrounding said stub tube below said crack;
   a generally cylindrical sleeve, axially contacting the upper and lower packing rings and outwardly radially restraining the upper packing ring, for surrounding said leaking tube joint;
   a thrust ring, axially contacting the upper packing ring;
   a generally cylindrical housing surrounding the sleeve, the packing ring, and the thrust ring and outwardly restraining the lower packing ring, including an inner, annular lip axially contacting the lower packing ring; and
   a sealing nut, engageable with the housing, for simultaneously urging the thrust ring against the upper packing ring and the annular lip of the housing against the lower packing ring, whereby a seal about said leakng tube joint is effected.

10. A method for remotely installing the apparatus for sealing a tube joint recited in claim 9, comprising the steps of:
    positioning said apparatus around said joint;
    externally holding said apparatus in position around said joint;
    externally compressing said apparatus axially for causing said apparatus to sealingly engage said tube joint thereby forming a seal against joint leakage; and
    locking said apparatus internally to retain said apparatus in the engaged, compressed state when the external compressing and holding forces are removed.

* * * * *